United States Patent
Kirch

[15] 3,686,301
[45] Aug. 22, 1972

[54] PREPARATION OF HALOSULFONYLBENZOYL HALIDES

[72] Inventor: Lawrence S. Kirch, 871 Oriole Lane, Huntingdon Valley, Pa. 19006

[22] Filed: May 23, 1969

[21] Appl. No.: 827,157

[52] U.S. Cl. ............................260/544 M, 260/543 R
[51] Int. Cl. ...........................................C07c 51/58
[58] Field of Search ......................260/544 R, 543 R

[56] References Cited

UNITED STATES PATENTS

| | | | |
|---|---|---|---|
| 2,946,815 | 7/1960 | Hamor | 260/470 |
| 2,016,784 | 10/1935 | Kraenzlein | 260/158 |

FOREIGN PATENTS OR APPLICATIONS

| | | | |
|---|---|---|---|
| 680,182 | 8/1939 | Germany | 260/544 |

*Primary Examiner*—Lorraine A. Weinberger
*Assistant Examiner*—Richard D. Kelly
*Attorney*—Carl A. Castellan and George W. F. Simmons

[57] ABSTRACT

Halosulfonylbenzoyl chlorides are prepared by the reaction of sulfobenzoic acids with compounds of the formula

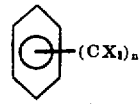

wherein X is chlorine or bromine and n is 1 or 2.

3 Claims, No Drawings

PREPARATION OF HALOSULFONYLBENZOYL HALIDES

This invention relates to a method of preparing certain arylsulfonyl halides, and in one of its embodiments to the preparation of certain halosulfonylbenzoyl halides.

There are several well-known processes for converting carboxylic acids and sulfonic acids to their acid halides. The conventional synthetic procedure involves reaction of the acid with thionyl chloride, phosphorous pentachloride, phosphorous oxychloride, or a similar halogenation reagent. In industrial applications, however, this type of reaction has several drawbacks, including the noxiousness and difficulty in handling the halogenation reagent, and difficulty in preparing acid halides free from phosphorus or sulfur impurities. The reaction of certain organic acids and salts with benzotrihalides has been reported in the prior art. Rabcewicz-Zubrowski, in Roczniki Chem. 9, 523–31 (1929), has described the reaction of certain aliphatic carboxylic acids and benzoic acid with benzotrichloride, generally in the presence of catalysts such as $ZnCl_2$, to give the corresponding acid chlorides. In U.S. Pat. Nos. 1,963,748 and 1,963,749, of Kyrides, granted June 19, 1934, there is described the reaction of aromatic dicarboxylic acids and anhydrides, such as phthalic anhydride, and benzotrichloride, also generally in the presence of a $ZnCl_2$ catalyst, to give phthalyl chloride. British Patent 384,722 discloses the reaction of salts of aliphatic and aromatic sulfonic acids with benzotrichloride to give the corresponding sulfonyl chlorides. The present invention provides a novel process in which aromatic sulfonic acids are converted to their sulfonyl halides, without a catalyst being necessary. This method is especially advantageous for converting aromatic compounds having both sulfonic acid and carboxylic acid groups, that is sulfobenzoic acids, to the corresponding halosulfonylbenzoyl halides.

According to the invention, a halosulfonylbenzoyl halide of the formula

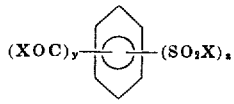

(I)

wherein X is chlorine or bromine, y is 1 or 2, and z is 1 or 2, can be prepared by contacting a compound of the formula

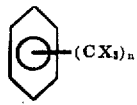

(II)

wherein n is 1 or 2 and X is as defined above, with an arylsulfonic acid, in acid form, having the formula

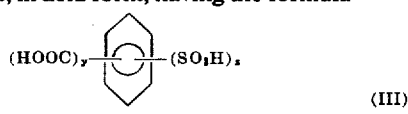

(III)

wherein y and z are as defined above.

The sulfobenzoic acids which are useful in the process of this invention can be unsubstituted, or they can have ring substituents which will not interfere with the reaction, such as alkyl groups, halogen atoms, alkoxy groups, and the like. Examples of useful sulfobenzoic acid reagents include 3-sulfobenzoic acid, 4-sulfobenzoic acid, 3,5-disulfobenzoic acid, 5-sulfo-1,3-benzenedicarboxylic acid, and the like.

Generally, benzotrichloride or benzotribromide is used as the halogenating compound. However, the corresponding xylohexahalides, that is when n in Formula I is 2, can also be advantageously employed as halogenating compounds. Furthermore, ring-substituted derivatives of the benzotrihalides or the xylohexahalides can also be employed, and their use may produce especially useful side products to the halogenation reaction. For example, when 3-chlorobenzotrichloride is reacted with a sulfobenzoic acid, 3-chlorobenzoyl chloride is produced as well as the acid chloride.

The process of the invention can be carried out over a broad temperature range, and the temperature at which the reaction is run will depend on part on the arysulfonyl chloride. Generally, the reaction will be run at a temperature of about 100° C. to 300° C., and the preferred temperature range is about 120° C. to 250° C.

The arylsulfonyl halides which are prepared by the process of the invention can be separated from the reaction mixture by any convenient means. Fractional distillation, at either atmospheric or reduced pressure, can be generally advantageously employed.

At least 1 mole of the benzotrihalide for each acid group is necessary for the conversion of 1 mole of the sulfobenzoic acid to its halosulfonylbenzoyl halides. The reaction can, however, be advantageously carried out using an excess of the benzotrihalide Of course, if a xylohexahalide is used as the halogenation reagent, only one-half mole will be necessary for each acid group in the sulfobenzoic acid.

The process of the invention can be carried out either with or without an additional solvent. The benzotrihalide or other halogenating compound may by itself serve as the solvent. However, the reaction can be advantageously run using an inert non-aqueous organic solvent, such as nitrobenzene, benzoyl chloride, benzenesulfonyl chloride, and the like.

The reaction time will depend on the reaction temperature, the arylsulfonic acid which is reacted, and other factors. In general, a reaction time of about 1 to 24 hours will be sufficient to essentially complete the reaction.

All of the starting compounds used in the process of the invention are well known and readily available materials. For example, sulfobenzoic acids can be prepared by the sulfonation of the benzoic acid with sulfur trioxide or oleum, a procedure well known in the at. The arylsulfonyl halides which are produced by the process are also known compounds with a wide variety of uses. They are especially useful as chemical intermediates.

The process of the invention has several advantages over known processes for producing organic acid halides. For example, benzotrichloride is a fairly inexpensive halogenating compound, as well as being relatively non-noxious and easy to handle in industrial applications. Furthermore, the benzoyl chloride is a recoverable and useful by-product of the reaction, while hydrogen chloride, the other by-product, is also readily removable from the reaction mixture, thus facilitating the production of acid halides free from unwanted impurities. The benzoyl halide which is recovered can be sulfonated to produce a sulfobenzoyl halide which can then be reacted with a benzotrihalide according to the process of the invention, thus producing a greater yield of the halosulfonylbenzoyl halide with a smaller quantity of the starting reagents. The reaction also gives exceptionally high yields of the acid halide without the necessity of a catalyst.

The following example will further illustrate this invention but is not intended to limit it in any way.

EXAMPLE

Preparation of 3,5-dichlorosulfobenzoyl chloride

Pure 3,5-disulfobenzoic acid was prepared by the method of Valyashko and Lutskii, Zh. Obshchei Khim, 21, 1069–91 (1951) 1 mole of the pure acid was heated to 180° C. and 3 moles of benzotrichloride added over a period of 3 hours. The temperature was gradually reduced during the benzotrichloride addition to 130° C. and maintained at 130° C. for 1 hour after the addition was completed. Benzoyl chloride was then stripped from the mix under reduced pressure to give 2.8 moles (96 percent yield) pure benzoyl chloride, b. 88°–90° C./20 mm Hg. The pressure was then reduced to 0.75 mm Hg and 3,5-dichlorosulfobenzoyl chloride distilled, b. 168°–175° C./.75 mm Hg. The distillate was crystallized from benzene to give a white crystalline solid melting sharply at 87° C. Overall yield of 3,5-dichlorosulfobenzoyl chloride was 91 percent based on 3,5-disulfobenzoic acid.

The process of the invention is also useful in producing arylsulfonyl chlorides from those arylsulfonic acids which do not contain a carboxylic acid group, such as, for example, benzensulfonic acid, 2-naphthalenesulfonic acid, 1,3,5-benzenetrisulfonic acid, toluenesulfonic acid, 4-chlorobenzenesulfonic acid, 4-bromobenzenesulfonic acid, and 4-methoxybenzenesulfonic acid, and from those arylsulfonic acids which contain an acid halide group, such as, for example, 3-sulfobenzoyl chloride, 4-sulfobenzoyl chloride, 3,5-disulfobenzoyl chloride, 5-sulfo-1,3-benzenedicarboxylic acid dichloride, and the like.

It is to be understood that changes and variations may be made without departing from the spirit and scope of the invention as defined by the appended claims.

I claim:

1. In a process for preparing a compound of the formula

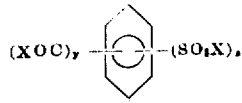

wherein X is bromine or chlorine, $y$ is 1 or 2 and $z$ is 1 or 2, the improvement which consists of contacting a compound of the formula

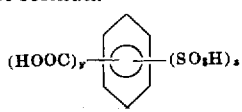

wherein $y$ and $z$ are as defined above, with at least $(y+z)/n$ moles of a compound of the formula

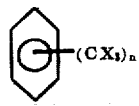

wherein X is as defined above and $n$ is 1 or 2.

2. The process of claim 1 wherein X is chlorine, $y$ is 1, $z$ is 2, and $n$ is 1.

3. The process of claim 1 which is carried out at a temperature of about 100° C. to about 300° C.